(12) United States Patent
Xin

(10) Patent No.: US 9,203,943 B2
(45) Date of Patent: Dec. 1, 2015

(54) APPARATUS AND METHOD FOR DETECTING TIME DIVISION DUPLEX NOISE OF COMMUNICATION DEVICE

(71) Applicant: Yang Xin, Shenzhen (CN)

(72) Inventor: Yang Xin, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 282 days.

(21) Appl. No.: 13/652,536

(22) Filed: Oct. 16, 2012

(65) Prior Publication Data

US 2013/0155886 A1 Jun. 20, 2013

(30) Foreign Application Priority Data

Dec. 16, 2011 (CN) .......................... 2011 1 0423042

(51) Int. Cl.
*H04L 12/26* (2006.01)
*H04M 1/24* (2006.01)
*H04M 1/60* (2006.01)

(52) U.S. Cl.
CPC .......... *H04M 1/24* (2013.01); *H04M 1/60* (2013.01); *H04M 2250/12* (2013.01)

(58) Field of Classification Search
USPC ................................................ 370/252, 317
See application file for complete search history.

(56) References Cited

U.S. PATENT DOCUMENTS

| | | | |
|---|---|---|---|
| 2007/0288233 A1* | 12/2007 | Kim | 704/208 |
| 2009/0168743 A1* | 7/2009 | Lee | 370/347 |
| 2011/0076941 A1* | 3/2011 | Taveau et al. | 455/41.1 |
| 2011/0111805 A1* | 5/2011 | Paquier et al. | 455/563 |
| 2011/0130176 A1* | 6/2011 | Magrath et al. | 455/570 |
| 2011/0251845 A1* | 10/2011 | Arakawa et al. | 704/270 |

* cited by examiner

*Primary Examiner* — Dang Ton
*Assistant Examiner* — Pamit Kaur
(74) *Attorney, Agent, or Firm* — Novak Druce Connolly Bove + Quigg LLP

(57) ABSTRACT

A method for detecting time division duplex (TDD) noise of a communication device, the communication device includes a radio frequency (RF) unit, a voice generation unit, a voice signal acquisition unit, an audio processing unit, and a processor. The RF unit emits a plurality of radio signals. The voice generation unit generates voice signals and outputs the voice signals. The voice signal acquisition unit acquires the voice signals. The audio processing unit converts the acquired voice signals into digital audio signals, and analyzes the digital audio signals to detect whether the digital audio signals contain time division duplex (TDD) noise. The processor generates a result indicating the digital audio signals contain or do not contain the TDD noise according to the analysis of the digital audio signals, and displays the result on a display of the communication device.

10 Claims, 2 Drawing Sheets

APPARATUS AND METHOD FOR DETECTING TIME DIVISION DUPLEX NOISE OF COMMUNICATION DEVICE

BACKGROUND

1. Technical Field

Embodiments of the present disclosure relate to noise detection technologies, and particularly to an apparatus and method for detecting time division duplex noise of a communication device.

2. Description of Related Art

During a time division duplex (TDD) communication between GSM (global system for mobile telecommunication) communication devices, audio interference with the GSM radio signals may generate TDD noise, which may result in a noisy and a low quality sound from the communication devices. Therefore, an improved solution for detecting the TDD noise of the communication devices during the manufacturing of the communication devices is desired.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean "at least one".

Figure 1:
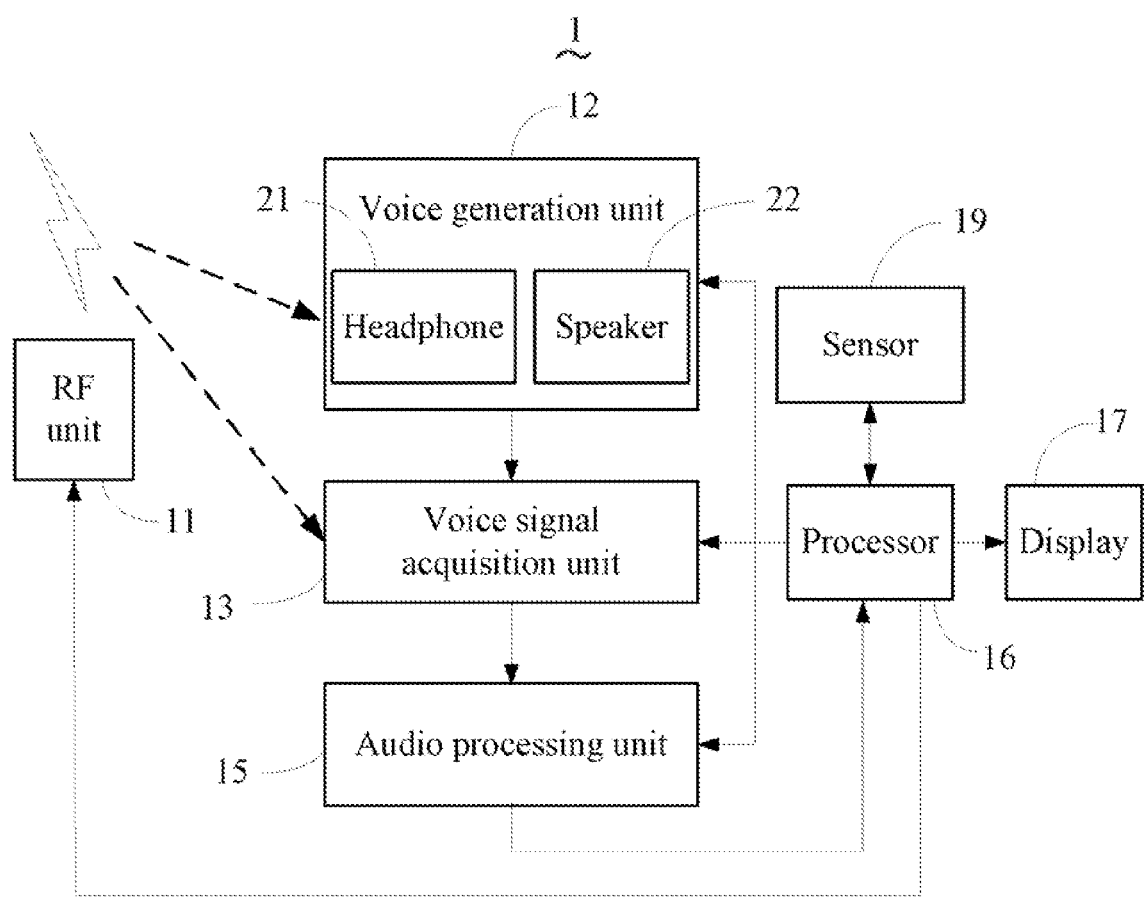
FIG. 1 illustrates a schematic block diagram of one embodiment of a communication device.

FIG. 1 is a schematic block diagram of one embodiment of a communication device 1. The communication device 1 includes a radio frequency (RF) unit 11, a voice generation unit 12, a voice signal acquisition unit 13, an audio processing unit 15, a processor 16, and a display 17. The voice generation unit 12 includes a headphone 21 and a speaker 22. In the embodiment, the communication device 1 may be, for example, a mobile phone, a wireless fixed telephone, or other similar device based on GSM communications. FIG. 1 shows one example of the communication device 1, in other embodiments, the communication device 1 can include more or fewer components such as storage devices and processors, or have a different configuration of the components.

The RF unit 11 emits a plurality of radio signals, such as GSM (global system for mobile telecommunication) signals. The voice generation unit 12 generates voice signals and outputs the voice signals through the headphone 21 and/or the speaker 22. In one embodiment, the voice signals may be generated by playing a predetermined audio prestored in the communication device 1. The voice signal acquisition unit 13 acquires the voice signals output from the voice generation unit 12. The audio processing unit 15 converts the acquired voice signals into digital audio signals, and analyzes the digital audio signals to detect whether the digital audio signals contain TDD noise. In the embodiment, the TDD noise refers to audio noise having a frequency of 217 HZ. In the embodiment, the digital audio signals may be analyzed using a spectrum analysis method, such as a fast fourier transform (FFT) method.

The voice signal acquisition module 13 may be a microphone. The audio processing unit 15 may be an audio codec.

The processor 16 may be a baseband chip, and configured for activating the RF unit 11 when a user activates the detection process of the TDD noise. For example, the user may activate the detection process according to a customized option menu of the communication device 1. The processor 16 further generates a result indicating whether the digital audio signals contain the TDD noise according to the analysis of the digital audio signals, and displays the result on the display 17.

Additionally, the communication device 1 may further include a sensor 19 configured for detecting whether the communication device 1 is shaking during the acquisition of the voice signals. If the communication device 1 is shaking during the detection of the TDD noise, the processor 16 notifies the user to keep the communication device 1 stationary and restart the detection of the TDD noise. For example, the processor 16 may play a predetermined voice message using the speaker 22 to notify the user. In the embodiment, the sensor 19 may be a G-sensor and electrically connected to the processor 16 through an inter-integrated circuit ($I^2C$) bus.

In another embodiment, the audio processing unit 15 further detects whether the digital audio signals contain noise within a predetermined frequency band, to determine whether the detection of the TDD noise interferes with other audio frequencies. For example, the predetermined frequency band may be defined as 300-3400 HZ according to a frequency band of most human voices. If the digital audio signals contain noise in the predetermined frequency band, the processor 16 notifies the user to restart the detection of the TDD noise by placing the communication device 1 in a quiet environment.

Figure 2:
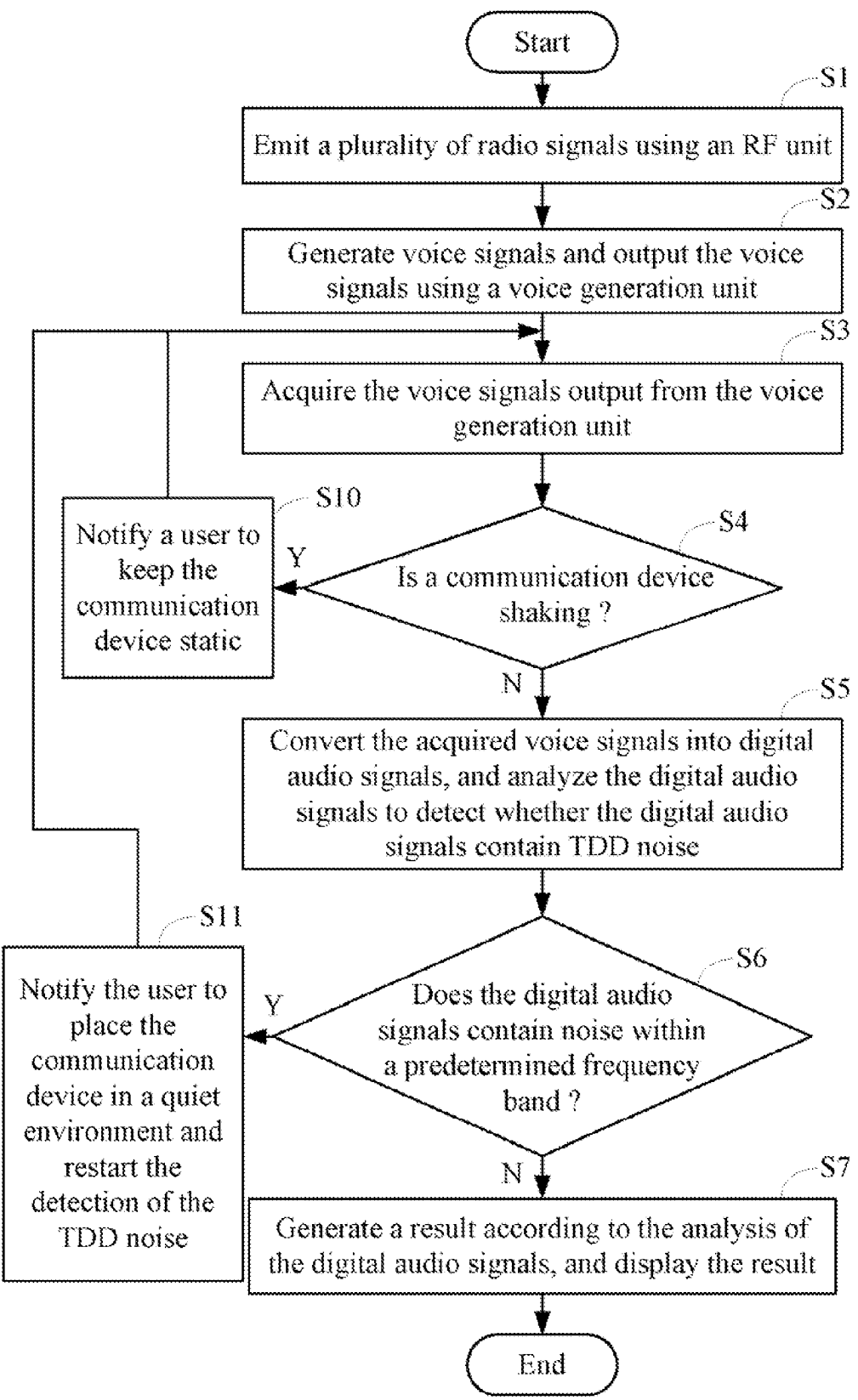
FIG. 2 is a flowchart of one embodiment of a method for detecting time division duplex noise of the communication device of FIG. 1.

FIG. 2 is a flowchart of one embodiment of a method for detecting the TDD noise of the communication device 1 of FIG. 1. Depending on the embodiment, additional steps may be added, others removed, and the ordering of the steps may be changed.

In step S1, the processor 16 activates the RF unit 11 to emit a plurality of radio signals when TDD noise detection is activated. For example, the user may activate the TDD noise detection by selecting a predetermined option in the customized option menu of the communication device 1.

In step S2, the voice generation unit 12 generates voice signals and outputs the voice signals via the headphone 21 and/or the speaker 22. In one embodiment, the voice signals may be generated by playing a predetermined audio message prestored in the communication device 1.

In step S3, the voice signal acquisition unit 13 acquires the voice signals output from the voice generation unit 12.

In step S4, the sensor 19 detects whether the communication device 1 is shaking during the acquisition of the voice signals. If it is determined that the communication device 1 is shaking, step S10 is implemented by the processor 16 to notify the user to keep the communication device stationary, and step S3 is repeated. Otherwise, if it is determined that the communication device 1 is not shaking, step S5 is implemented.

In step S5, the audio processing unit 15 converts the acquired voice signals into digital audio signals, and analyzes the digital audio signals to detect whether the digital audio signals contain noise having a frequency of 217 HZ which indicate TDD noise. In the embodiment, the digital audio signals may be analyzed using a spectrum analysis method, such as a fast Fourier transform (FFT) method.

In step S6, the audio processing unit 15 detects whether the digital audio signals contain noise within a predetermined frequency band, to determine whether the detection of the TDD noise interferes with other audio frequencies. For example, the predetermined frequency band may be defined as 300-3400 HZ according to a frequency band of most human voices. If the digital audio signals contain noise in the predetermined frequency band, the process goes to step S11, and the processor 16 notifies the user to restart the detection of the TDD noise by placing the communication device 1 in a quiet environment, when the user indicates that the communication device 1 is in a quiet environment, the process goes to step S3. If no noise in the predetermined frequency band is contained in the digital audio signals, the process goes to step S7, and the processor 16 generates a result indicating the digital audio signals contain or do not contain the TDD noise according to the analysis of the digital audio signals, and displays the result on the display 17.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A communication device comprising:
   a customized option menu having a predetermined option to activate a detection process for detecting time division duplex (TDD) noise;
   a radio frequency (RF) unit that emits a plurality of radio signals when the detection process is activated;
   a voice generation unit that generates voice signals and outputs the voice signals;
   a voice signal acquisition unit that acquires the voice signals;
   an audio processing unit that converts the acquired voice signals into digital audio signals, and analyzes the digital audio signals to detect whether the digital audio signals contain the TDD noise; and
   a processor that generates a result indicating the digital audio signals contain or do not contain the TDD noise according to the analysis of the digital audio signals, and displays the result on a display of the communication device;
   wherein the audio processing unit further determines whether the detection process for detecting the TDD noise interferes with other audio frequencies by detecting whether the digital audio signals contain noise within a predetermined frequency band, and the processor further notifies the user to place the communication device in a quiet environment and restart the detection process when the digital audio signals contain the noise in the predetermined frequency band.

2. The communication device according to claim 1, wherein the predetermined frequency band is between 300-3400 HZ.

3. The communication device according to claim 1, wherein the TDD noise refers to audio noise having a frequency of 217 HZ.

4. The communication device according to claim 1, wherein the voice signals are generated by playing a predetermined audio message prestored in the communication device.

5. The communication device according to claim 1, wherein the radio signals are global system for mobile telecommunication (GSM) signals.

6. A method for detecting time division duplex (TDD) noise of a communication device, the communication device comprising a radio frequency (RF) unit, a voice generation unit, a voice signal acquisition unit, an audio processing unit, a processor, and a customized option menu having a predetermined option to activate a detection process for detecting TDD noise, the method comprising:
   emitting a plurality of radio signals using the RF unit when the detection process is activated;
   generating voice signals and outputting the voice signals using the voice generation unit;
   acquiring the voice signals using the voice signal acquisition unit;
   converting the acquired voice signals into digital audio signals, and analyzing the digital audio signals to detect whether the digital audio signals contain TDD noise using the audio processing unit;
   generating a result indicating whether digital audio signals contain the TDD noise according to the analysis of the digital audio signals, and displaying the result on a display of the communication device;
   detecting whether the communication device is shaking during acquisition of the voice signals using a sensor; and
   notifying a user to keep the communication device stationary and restart the detection process for detecting the TDD noise using the processor when the communication device is detected to be shaking during the process of acquiring the voice signals by the voice signal acquisition unit.

7. A communication device, comprising:
   a radio frequency (RF) unit that emits a plurality of radio signals;
   a voice generation unit that generates voice signals and outputs the voice signals;
   a voice signal acquisition unit that acquires the voice signals;
   an audio processing unit that converts the acquired voice signals into digital audio signals, and analyzes the digital audio signals to detect whether the digital audio signals contain time division duplex (TDD) noise; and
   a processor that generates a result indicating the digital audio signals contain or do not contain the TDD noise according to the analysis of the digital audio signals, and displays the result on a display of the communication device;
   wherein the communication device further comprising a sensor that detects whether the communication device is shaking during a process of acquiring the voice signals by the voice signal acquisition unit; and
   the processor further notifies a user to keep the communication device stationary and restart a detection process for detecting the TDD noise if the communication device is shaking during the process of acquiring the voice signals by the voice signal acquisition unit.

8. The communication device according to claim 7, wherein the TDD noise refers to audio noise having a frequency of 217 HZ.

9. The communication device according to claim 7, wherein the voice signals are generated by playing a predetermined audio message prestored in the communication device.

10. The communication device according to claim 7, wherein the radio signals are global system for mobile telecommunication (GSM) signals.

* * * * *